US011818119B1

(12) United States Patent
Dayan et al.

(10) Patent No.: US 11,818,119 B1
(45) Date of Patent: Nov. 14, 2023

(54) DYNAMIC AND MONITORED ACCESS TO SECURE RESOURCES

(71) Applicant: CyberArk Software Ltd., Petach-Tikva (IL)

(72) Inventors: Tomer Dayan, Petach-Tikva (IL); Ofir Iluz, Petach-Tikva (IL); Yaron Nisimov, Petach-Tikva (IL)

(73) Assignee: CYBERARK SOFTWARE LTD., Petach-Tikva (IL)

( * ) Notice: Subject to any disclaimer, the term of this patent is extended or adjusted under 35 U.S.C. 154(b) by 0 days.

(21) Appl. No.: 18/059,780

(22) Filed: Nov. 29, 2022

(51) Int. Cl.
*H04L 29/06* (2006.01)
*H04L 9/40* (2022.01)

(52) U.S. Cl.
CPC ............ *H04L 63/083* (2013.01); *H04L 63/20* (2013.01)

(58) Field of Classification Search
CPC ....... H04L 63/20; H04L 63/083; H04L 63/10; H04L 63/108; H04L 63/0807; H04L 63/0884
USPC ............................................................ 726/6
See application file for complete search history.

(56) References Cited

U.S. PATENT DOCUMENTS 10,116,658 B2 * 10/2018 Sade .................... H04L 63/0807
10,681,547 B1 * 6/2020 Yang .................... H04L 63/0263
2016/0164878 A1 6/2016 Nakano
2017/0208055 A1 7/2017 Golwalkar et al.
2021/0119764 A1 4/2021 Meghji
2021/0250422 A1 8/2021 Mladin et al.
2022/0109675 A1 4/2022 Williams et al.
2022/0188448 A1 6/2022 Levit et al.
2022/0255931 A1 8/2022 Avetisov et al.

OTHER PUBLICATIONS

Office Action dated Feb. 24, 2023, issued by the U.S. Patent and Trademark Office in co-pending U.S. Appl. No. 18/059,737.
Final Office Action dated Jun. 9, 2023, issued by the U.S. Patent and Trademark Office in co-pending U.S. Appl. No. 18/059,737.

* cited by examiner

*Primary Examiner* — Longbit Chai
(74) *Attorney, Agent, or Firm* — FINNEGAN, HENDERSON, FARABOW, GARRETT & DUNNER, LLP

(57) ABSTRACT

Disclosed embodiments relate to providing dynamic and least-privilege access to network resources. Techniques include receiving a request from a network identity to access a network resource, authenticating the network identity using a native client and communication protocol, authorizing the network identity based on one or more access policy, generating a least privilege ephemeral account having ephemeral credentials, accessing the network resource using the ephemeral credentials, and enabling the network identity to access the network resource using the least-privilege ephemeral account using the native client and communication protocol. The techniques may further include matching an existing account to the network identity based on the one or more access policy and enabling the network identity to access the network resource using the matched existing account using the native client and communication protocol.

20 Claims, 8 Drawing Sheets

US 11,818,119 B1

DYNAMIC AND MONITORED ACCESS TO SECURE RESOURCES

BACKGROUND

Modern computer systems use a variety of permission structures to grant users access to secure network resources. A common approach for authorizing access to secure network resources is to provide credentials through persistent authorization after verifying a user's identity using some form of single or multi-factor authentication. Under this approach, users may retain long-lived credentials to access network resources, such as usernames, passwords, or API keys that typically do not expire. Users may be given long-standing permission to access a variety of secure network resources that may extend past the time that the user needs the higher levels of permission. It can be difficult to track highly valuable credentials in growing organizations with large numbers of privileged accounts, making it easy for organizations to lose record of which users have access to which network resources and the permission levels each user maintains. Weak management of credentials may lead to credentials being forgotten, duplicated, or stolen.

Although privileged permissions and credentials are aimed at maintaining the security of network resources, they are also avenues for attackers to gain unauthorized access to privileged network resources. There are a variety of ways to protect secure network resources from hackers. System administrators may set policies regarding password complexity and frequency of password changes among users. Networks may run discovery for unmanaged privileged accounts and credentials to detect indicators that permissions may have been compromised. Networks may also isolate certain permissions and monitor sessions using those permissions to further detect if an account has been compromised. However, the large quantity of standing privileged accounts within an organization provides hackers increasing opportunities to attack secure network resources.

An alternative approach to securing network resource access is to minimize the number of standing privileged accounts. Just-in-time privileged access to network resources may be created, and this just-in-time access may minimize the number of standing privileged accounts within an organization. Fewer standing privileged accounts may decrease the opportunities for attackers to infiltrate secure network resources. However, these just-in-time privileged access systems may be difficult for end users because these systems require the installation and use of agents by the end user. These solutions may also be difficult to implement at a large organizational scale.

Therefore, to address these technical and security deficiencies, solutions should implement the use of just-in-time privileged accounts while maintaining an easy-to-use interface for end users. Such techniques should allow for agentless access to secure network resources. These techniques should allow end users to access network resources using native clients and existing communication protocols without any modification to the network resource itself. By allowing end users to access secure network resources through an agentless system using a native client and communication protocol, the number of standing privileged accounts may be reduced while still maintaining a user-friendly interface for end users. These techniques may provide increased security of network resources by reducing the use of standing privileged accounts and thus minimizing an attacker's ability to infiltrate a secure network resource.

SUMMARY

The disclosed embodiments describe non-transitory computer readable media for providing dynamic and least-privilege access to network resources. For example, in an embodiment, a non-transitory computer readable medium may include instructions that, when executed by at least one processor, may cause the at least one processor to perform operations for providing dynamic and least-privilege access to a network resource. The operations may comprise receiving a request from a network identity to access a network resource, authenticating the network identity using a native client and communication protocol, wherein the native client is configured for communicating transparently with the network resource, authorizing the network identity based on one or more access policy, the one or more access policy comprising rules for network resource accessibility, generating a least-privilege ephemeral account having ephemeral credentials, based on the one or more access policy, accessing the network resource using the ephemeral credentials, and enabling the network identity to access the network resource using the least-privilege ephemeral account using the native client and communication protocol.

According to a disclosed embodiment, using the native client and communication protocol may further comprise identifying parameters to connect to a proxy and an identification of the network resource.

According to a disclosed embodiment, the operations may further comprise decommissioning the least-privilege ephemeral account and the ephemeral credentials after termination of a connection.

According to a disclosed embodiment, the request from the network identity may further comprise a request to perform one or more actions on the network resource.

According to a disclosed embodiment, generating the least-privilege ephemeral account may be performed using a privileged account.

According to a disclosed embodiment, the one or more access policy may be based on a time restriction, and the time restriction may comprise a policy governing when the network identity can connect to the network resource, a number of times the network identity can connect to the network resource, or an idle time of the network identity.

According to a disclosed embodiment, the one or more access policy may be based on one or more attributes related to a user machine, the network identity, one or more network attributes, a requested action type, a requested resource type, or one or more environmental conditions.

According to a disclosed embodiment, the one or more access policy may be based on an address of the network resource, an instance name of the network resource, a schema of the network resource, a type of command, a table of the network resource, a column of the network resource, or a row of the network resource.

According to a disclosed embodiment, authenticating the network identity may be performed using a personal account and a credential of the network identity.

According to a disclosed embodiment, the operations may further comprise a resource discovery stage.

According to a disclosed embodiment, the operations may further comprise generating one or more access policies based on the discovery of the network resource integration.

According to a disclosed embodiment, authenticating the network identity using an existing protocol may occur conditional on the network using a native client.

According to another disclosed embodiment, a non-transitory computer readable medium may include instructions that, when executed by at least one processor, may cause the at least one processor to perform operations for providing dynamic and least-privilege access to a network resource. The operations may comprise receiving a request from a network identity to access a network resource, authenticating the network identity using a native client and communication protocol wherein the native client is configured for communicating transparently with the network resource, authorizing the network identity based on one or more access policy, the one or more access policy comprising rules for network resource accessibility, matching an existing account to the network identity based on the one or more access policy, and enabling the network identity to access the network resource using the matched existing account, using the native client and communication protocol.

According to a disclosed embodiment, the operations may further comprise accessing a credential.

According to a disclosed embodiment, the credential may be an ephemeral credential.

According to a disclosed embodiment, the operations may further comprise configuring access to an existing account to create credentials to the existing least-privilege account.

According to a disclosed embodiment, the request from the network identity may comprise identifying the account to connect with.

According to a disclosed embodiment, matching the existing least-privilege account to the network identity may further comprise accessing a list of permitted existing accounts, accessing a list of permissions that the network identity needs to perform the one or more requested actions, and choosing a least-privilege account from the list of permitted accounts based on the one or more access policy.

According to a disclosed embodiment, the operations may further comprise fetching a credential for the existing least-privilege account from a secure location.

According to a disclosed embodiment, the operations may further comprise generating a credential for the least-privilege account based on a strong account.

According to another disclosed embodiment, a non-transitory computer readable medium may include instructions that, when executed by at least one processor, may cause the at least one processor to perform operations for providing dynamic and least-privilege access to a network resource. The operations may comprise receiving a request from a network identity to access a network resource, authenticating the network identity using native client and communication protocol, wherein the native client is configured for communicating transparently with the network resource, authorizing the network identity based on one or more access policy, the one or more access policy comprising rules for network resource accessibility, fetching a credential of an existing privileged account, creating a just-in-time session to the network resource, accessing the network resource using the credential of the existing privileged account, monitoring the just-in-time session between the network identity and the network resource, identifying one or more action or command requested by the network identity within the native communication protocol, and validating the one or more requested action or command in real-time based on the one or more access policy.

According to a disclosed embodiment, the operations may further comprise configuring access to an existing account to create credentials to the existing account.

According to a disclosed embodiment, fetching existing credentials may comprise fetching the credentials for the existing privileged account from a secure location.

According to a disclosed embodiment, validating the one or more actions performed by the network identity may comprise receiving a request from the network identity to perform an action through the just-in-time session, accessing the one or more access policy for the just-in-time session, and validating if the requested action is permitted based on the one or more access policy.

According to a disclosed embodiment, the operations may further comprise performing the requested action on the network resource if the requested action is validated.

According to a disclosed embodiment, the operations may further comprise sending a message to the network identity through the just-in-time session in connection with the status of the requested action.

According to a disclosed embodiment, the operations may further comprise determining whether the requested action or command is permitted by the access policy, and performing the requested action or command on the network resource.

According to a disclosed embodiment, the operations may further comprise confirming to the network identity that the requested action or command was performed.

According to a disclosed embodiment, the network resource may be a database.

According to a disclosed embodiment, the request to access the network. resource may further comprise a request to perform one or more actions on the network resource.

According to a disclosed embodiment, the operations may further comprise a resource discovery phase.

According to a disclosed embodiment, the operations may further comprise generating one or more access policies based on the discovery of the network resource integration.

According to a disclosed embodiment, authenticating the network identity may be performed using a personal account and a credential of the network identity.

According to another disclosed embodiment, there may be a computer-implemented method for providing dynamic and least-privilege access to a network resource. The method may comprise receiving a request from a network identity to access a network resource, authenticating the network identity using native client and communication protocol, wherein the native client is configured for communicating transparently with the network resource, authorizing the network identity based on one or more access policy, the one or more access policy comprising rules for network resource accessibility, fetching the credential of an existing privileged account, creating a just-in-time session to the network resource, accessing the network resource using the credential of the existing privileged account, monitoring the just-in-time session between the network identity and the network resource, identifying one or more action or command requested by the network identity within the native communication protocol, and validating the one or more requested action or command in real-time based on the one or more access policy.

According to a disclosed embodiment, the fetched credential of the existing privileged account may be an ephemeral credential created to access the just-in-time session with the existing privileged account.

According to a disclosed embodiment, validating the one or more requested action or command may occur before performing the one or more requested action or command.

According to a disclosed embodiment, the request to access the network resource may further comprise a request to perform one or more actions on the network resource.

According to a disclosed embodiment, the one or more access policy may be based on a time restriction, the time restriction comprising a policy governing when the network identity can connect to the network resource, a number of times the network identity can connect to the network resource, or an idle time of the network identity.

According to a disclosed embodiment, the one or more access policy may be based on attributes related to the network identity, a user machine, network related attributes, requested action types, requested resource types, or environmental conditions.

According to a disclosed embodiment, the one or more access policy may be based on an address of the network resource, an instance name of the network resource, a schema of the network resource, a table of the network resource, or a row of the network resource.

Aspects of the disclosed embodiments may include tangible computer readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments.

BRIEF DESCRIPTION OF THE DRAWINGS

The accompanying drawings, which are incorporated in and constitute a part of this specification, illustrate disclosed embodiments and, together with the description, explain the disclosed embodiments.

DETAILED DESCRIPTION

Figure 1:
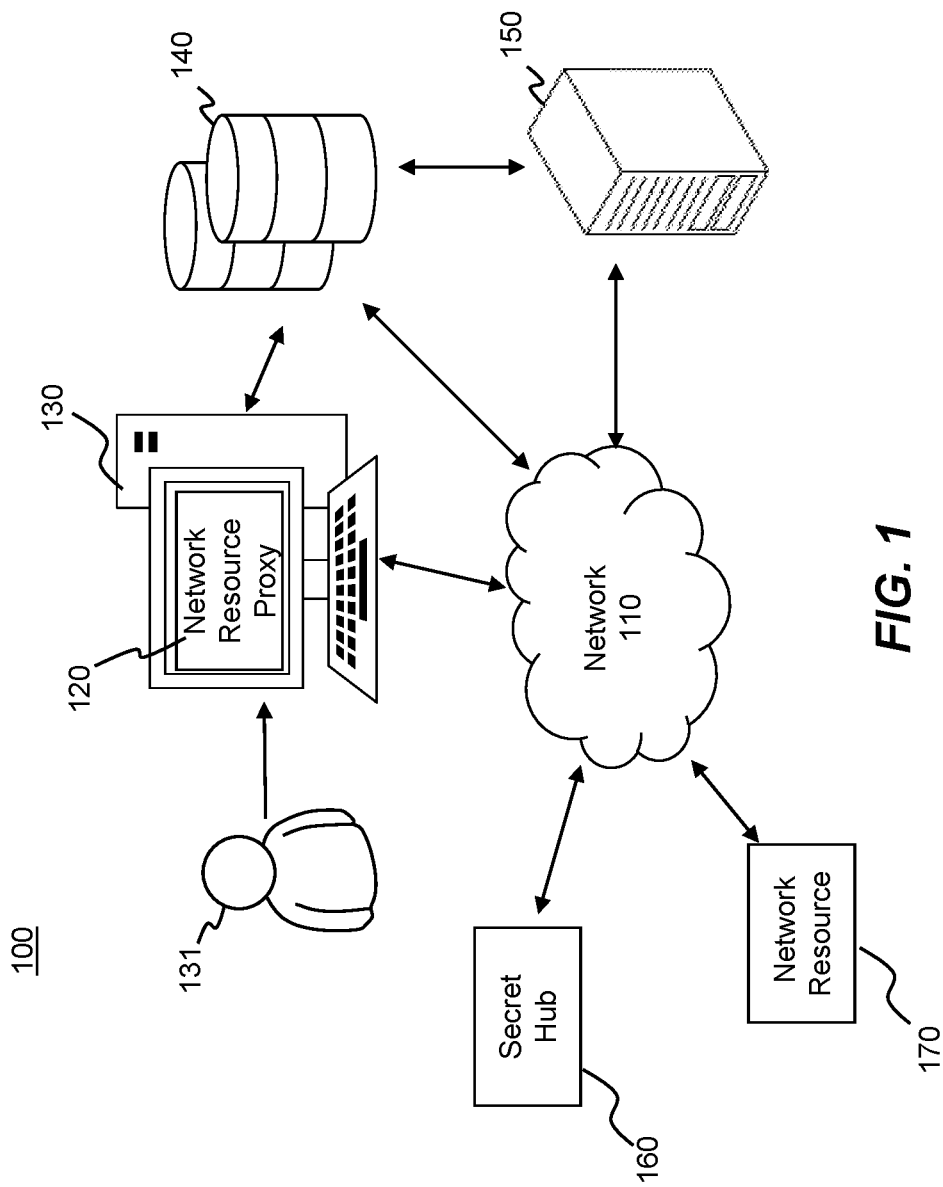
FIG. 1 is a block diagram of an exemplary system for providing dynamic and least-privilege access to a network resource in accordance with disclosed embodiments.

In the following detailed description, numerous specific details are set forth to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence or constrained to a particular system configuration. Additionally, some of the described embodiments or elements thereof can occur or be performed simultaneously, at the same point in time, or concurrently.

The techniques for providing dynamic and least-privilege access to a network resource described herein overcome several technological problems relating to security, efficiency, and functionality in the fields of cybersecurity and software management. In particular, the disclosed embodiments provide techniques for providing just-in-time access to network resources. As discussed above, attackers may target credentials to access secure network resources. Reducing the number of standing privileged accounts through the use of just-in-time privileged access may reduce the opportunities for attackers to gain access to secure network resources. Existing techniques for providing just-in-time privileged access, however, fail to provide an agentless system that uses native client and communication protocols.

The disclosed embodiments provide technical solutions to these and other problems arising from current techniques. For example, various disclosed techniques create efficiencies over current techniques by authenticating and authorizing a network identity based on one or more access policy and generating least-privilege ephemeral credentials to access a network resource or matching an existing account to the network identity. The disclosed techniques also do not require passwords or other user credentials to be stored on a client device, thereby improving security in the network. The disclosed techniques further limit the scope of access granted to a user such that user access is narrowly tailored based on permissions associated with the access requests of the user. Further, the disclosed techniques do not require a dedicated agent or client to be installed on a client device for establishing a secure connection. The user only needs software components that are native to the user device or operating system. For example, remote access to the network resource may be established using a native client and communication protocol, without the need for a VPN client, a web-based portal, or other non-native software. This improves the experience for the user and provides increased flexibility in the types of devices that can access the network resource.

Reference will now be made in detail to the disclosed embodiments, examples of which are illustrated in the accompanying drawings.

FIG. 1 illustrates an exemplary system 100 for providing dynamic and least-privilege access to a network resource, consistent with the disclosed embodiments. System 100 may represent an environment in which software code is developed and/or executed, for example in a cloud environment. System 100 may include one or more network resource proxies 120, one or more computing devices 130, one or more databases 140, one or more servers 150, one or more secret hubs 160, and one or more network resources 170 as shown in FIG. 1.

The various components may communicate over a network 110. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system 100 is shown as a network-based environment, it is understood that the disclosed systems and methods may also be used in a localized system, with one or more of the components communicating directly with each other.

Computing devices 130 may be a variety of different types of computing devices capable of developing, storing, analyzing, and/or executing software code. For example, computing device 130 may be a personal computer (e.g., a desktop or laptop), an IoT device (e.g., sensor, smart home appliance, connected vehicle, etc.), a server, a mainframe, a vehicle-based or aircraft-based computer, a virtual machine (e.g., virtualized computer, container instance, etc.), or the like. Computing device 130 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), or various other devices capable of processing and/or receiving data. Computing device 130 may operate using a Windows™ operating system, a terminal-based (e.g., Unix or Linux) operating system, a cloud-based operating system (e.g., through AWS™, Azure™, IBM Cloud™, etc.), or other types of non-terminal operating systems. As discussed further below, computing devices 130 may be used for developing and/or running software code, functions, or scripts. For example, a user 131 may develop software code through an Integrated Development Environment (IDE) 132 operated on computing device 130.

System 100 may further comprise one or more database(s) 140, for storing and/or executing software. For example, database 140 may be configured to store software or code, such as code developed using computing device 130. Database 140 may further be accessed by computing device 130, server 150, or other components of system 100 for downloading, receiving, processing, editing, or running the stored software or code. Database 140 may be any suitable combination of data storage devices, which may optionally include any type or combination of databases, load balancers, dummy servers, firewalls, back-up databases, and/or any other desired database components. In some embodiments, database 140 may be employed as a cloud service, such as a Software as a Service (SaaS) system, a Platform as a Service (PaaS), or Infrastructure as a Service (IaaS) system. For example, database 140 may be based on infrastructure or services of Amazon Web Services™ (AWS™), Microsoft Azure™, Google Cloud Platform™, Cisco Metapod™, Joyent™, vmWare™, or other cloud computing providers. Data sharing platform 140 may include other commercial file sharing services, such as Dropbox™, Google Docs™, or iCloud™. In some embodiments, data sharing platform 140 may be a remote storage location, such as a network drive or server in communication with network 110. In other embodiments database 140 may also be a local storage device, such as local memory of one or more computing devices (e.g., computing device 130) in a distributed computing environment.

System 100 may also comprise one or more server device(s) 150 in communication with network 110. Server device 150 may manage the various components in system 100. In some embodiments, server device 150 may be configured to process and manage requests between computing devices 130 and/or databases 140. In embodiments where software code is developed within system 100, server device 150 may manage various stages of the development process, for example, by managing communications between computing devices 130 and databases 140 over network 110. Server device 150 may identify updates to code in database 140, may receive updates when new or revised code is entered in database 140, and may participate in providing dynamic and least-privilege access to network resources as discussed below in connection with FIGS. 5-6.

System 100 may also comprise one or more network resource proxies 120 in communication with network 110. Network resource proxy 120 may be any device, component, program, script, or the like, for providing dynamic and least-privilege access to network resources within system 100, as described in more detail below. Network resource proxy 120 may be configured to monitor other components within system 100, including computing device 130, database 140, and server 150. In some embodiments, network resource proxy 120 may be implemented as a separate component within system 100, capable of analyzing software and computer codes or scripts within network 110. In other embodiments, network resource proxy 120 may be a program or script and may be executed by another component of system 100 (e.g., integrated into computing device 130, database 140, or server 150). Network resource proxy 120 may further comprise one or more components for performing various operations of the disclosed embodiments. For example, network resource proxy 120 may be configured to generate a least-privilege ephemeral account having ephemeral credentials based on one or more access policy and enable a network identity to access a network resource using the least-privilege ephemeral account using a native client and communication protocol as discussed below. Network resource proxy 120 may further be configured to match an existing account to a network identity based on one or more access policies and enable the network identity to access the network resource using the matched existing account, using native client and communication protocols.

System 100 may further comprise a secret hub 160. Secret hub 160 may be any form of secure storage location for storing secrets, which may include, but are not limited to, passwords, credentials, encryption keys, tokens, certificates, or any other form of access credential for use in applications, services, privileged accounts, and other secure network resources. Secret hub 160 may allow for central management of secrets across multiple accounts within a network and allow security access policies to be consistently enforced across multiple accounts. In particular, secret hub 160 may encrypt and store credentials required to access network resource 170. Secret hub 160 may authenticate and authorize users, machines, or applications attempting to access one or more secrets before permitting access to stored sensitive data. As an example implementation, secret hub 160 may be implemented as a CyberArk™ vault or the like. Alternative implementations of secret hub 160 are possible as well.

System 100 may further comprise a network resource 170. Network resource 170 may refer to any type of computing resource within a network that may be accessed by entities (e.g., users, machines, applications) through a communications network. Examples of network resources 170 may include servers, databases or or data structures holding confidential information, restricted-use applications, operating system directory services, access-restricted cloud-computing resources, sensitive IoT equipment, or any other computer-based equipment or software that may be accessible over a network (e.g., network 110). Other examples of network resources 170 may include files, folders, elements in cloud buckets, databases, serverless function settings, logs, computer programs, computer codes, machine executable instructions, or any other type of data that may be stored in a data structure. In some embodiments, network resource 170 may be a privileged resource to which access is limited or restricted.

Figure 2:
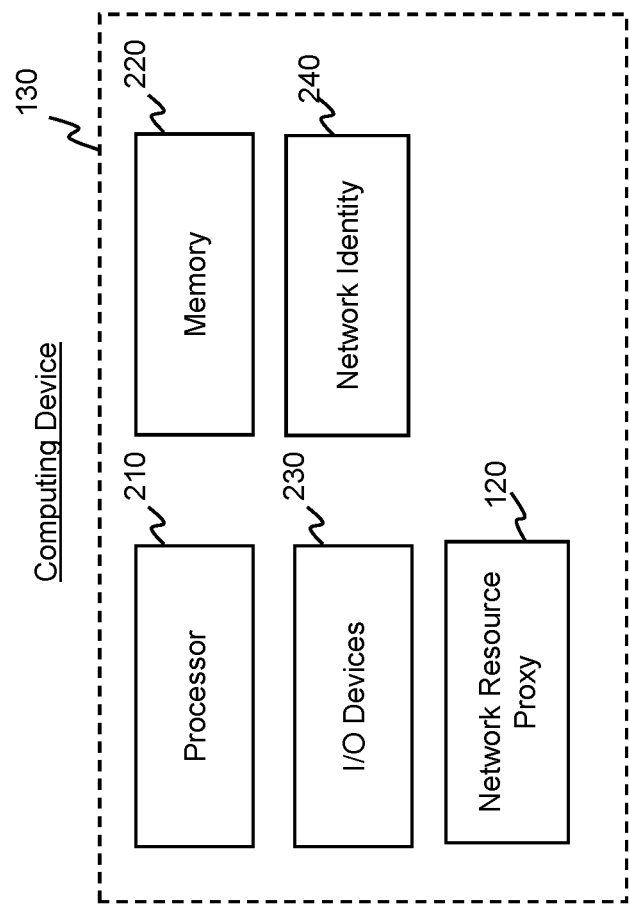
FIG. 2 is a block diagram showing an exemplary computing device including a network resource proxy for providing dynamic and least-privilege access to a network resource in accordance with disclosed embodiments.

FIG. 2 is a block diagram showing an exemplary computing device 130 including network resource proxy 120 in accordance with disclosed embodiments. Computing device 130 may include a processor 210. Processor (or processors) 210 may include one or more data or software processing devices. For example, the processor 210 may take the form of, but is not limited to, a microprocessor, embedded processor, or the like, or may be integrated in a system on a chip (SoC). Furthermore, according to some embodiments, the processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. In some embodiments, network resource proxy 120 may be employed as a cloud service, such as a Software as a Service (SaaS) system, a Platform as a Service (PaaS), or Infrastructure as a Service (IaaS) system. For example, network resource proxy 120 may be based on infrastructure of services of Amazon Web Services™ (AWS™) Microsoft Azure™, Google Cloud Platform™, Cisco Metapod™, Joyent™, vmWare™, or other cloud computing providers. The disclosed embodiments are not limited to any type of processor configured in the computing device 130.

Memory (or memories) 220 may include one or more storage devices configured to store instructions or data used by the processor 210 to perform functions related to the disclosed embodiments. Memory 220 may be configured to store software instructions, such as programs, that perform one or more operations when executed by the processor 210 to provide dynamic and least-privilege access to network resources from computing device 130, for example, using methods 500 and 600, described in detail below. The disclosed embodiments are not limited to software programs or devices configured to perform dedicated tasks. For example, the memory 220 may store a single program, such as a user-level application, that performs the functions of the disclosed embodiments, or may comprise multiple software programs. Additionally, the processor 210 may in some embodiments execute one or more programs (or portions thereof) remotely located from the computing device 130. Furthermore, the memory 220 may include one or more storage devices configured to store data (e.g., machine learning data, training data, algorithms, etc.) for use by the programs, as discussed further below.

Computing device 130 may further include one or more input/output (I/O) devices 230. I/O devices 230 may include one or more network adaptors or communication devices and/or interfaces (e.g., WiFi, Bluetooth®, RFID, NFC, RF, infrared, Ethernet, etc.) to communicate with other machines and devices, such as with other components of system 100 through network 110. For example, network resource proxy 120 may use a network adaptor to scan for code and code segments within system 100. In some embodiments, the I/O devices 230 may also comprise a touchscreen configured to allow a user to interact with network resource proxy 120 and/or an associated computing device. The I/O device 230 may comprise a keyboard, mouse, trackball, touch pad, stylus, and the like.

Network identity 240 may refer to any entity that may request access to network resource 170. In some embodiments, network identity 240 may refer to a particular user or account. For example, network identity 240 may include user 131 associated with one or more credentials for accessing the network resource 170. In some embodiments, network identity 240 may include a client device through which user 131 may access network resource 170. For example, a client device may be a personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may engage in accessing network resource 170. In some embodiments, network identity 240 may be a virtual machine (e.g., based on AWS™, Azure™, IBM Cloud™, etc.), container instance (e.g., Docker™ container, Java™ container, Windows Server™ container, etc.), or other virtualized instance. In some embodiments, network identity 240 may be a software instance or application executing on a client device. Using the disclosed methods, network identity 240 may access network resource 170 through a least-privilege ephemeral account using native client and communication protocols.

Aspects of the present disclosure may involve providing dynamic and least-privilege access to a network resource. Dynamic and least-privilege access may refer to providing a minimum level of access to a network identity that is needed to perform a requested action on the network resource. For example, the dynamic and least-privilege access granted to a network identity may be limited or restricted to allow the network identity to access only the elements of a network resource that are needed to complete a specific task or request. The dynamic and least-privilege access may allow a network identity to access network resources or run privileged commands on network resources on a temporary and as-needed basis, using one or more native client and communication protocols. Providing dynamic and least-privilege access to a network resource may comprise provisioning privileged just-in-time access to network resources. For example, access to network resources may be provided to users based on dynamic access policy rules and requirements.

Figure 3:
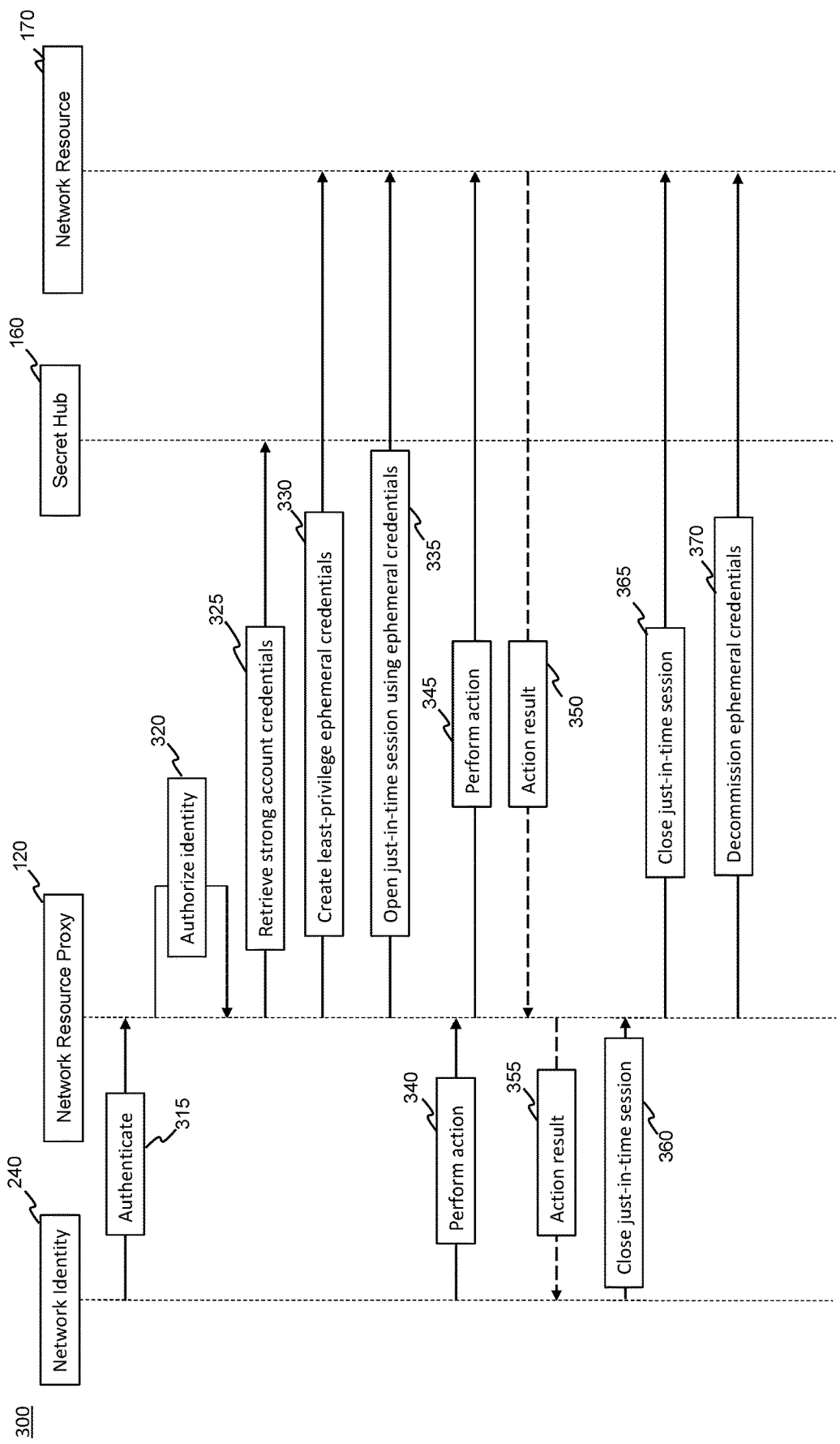
FIG. 3 is a block diagram showing an exemplary process for providing dynamic and least-privilege access to a network resource in accordance with disclosed embodiments.

FIG. 3 is a block diagram illustrating an exemplary process 300 for providing dynamic and least-privilege access to a network resource, consistent with disclosed embodiments. Process 300 may provide dynamic and least-privilege access to network resource 170 by network identity 240. As used herein, accessing network resource 170 may include any operation by a network device or network identity involving data or information stored on network resource 170, storing information on network resource 170, deleting or modifying information on network resource 170, or any other forms of operations requiring access to network resource 170.

At step 315 of process 300, the network identity may be authenticated by network resource proxy 120. Authenticating network identity 240 may in some embodiments include verifying the identity of network identity 240. For example, authentication of network identity 240 may be performed according to at least one of RDP, SSH, Password Authentication Protocol (PAH), Challenge Handshake Authentication Protocol (CHAP), Basic Access Authentication, Host Identity Protocols, tabular data stream (TDS), OpenID, Security Assertion Markup Language (SAML), HTTPS, TLS, or any other authentication protocol. In some embodiments, authentication may be performed through biometric authentication (e.g., a retinal scan, facial recognition, a fingerprint scan, a voiceprint identification, etc.), a user pin, a password, scanning a QR code, device-based authentication, or any other method suitable for authenticating network identity 240. In some embodiments, authentication of network identity 240 may be a single-factor authentication, requiring satisfaction of one factor for authentication. In other embodiments, authentication of network identity 240 may require two-factor or multi-factor authentication, which requires satisfaction of at least two factors for authentication.

At step 320 of process 300, network resource proxy 120 may authorize network identity 240. Authorization of network identity 240 may determine if network identity 240 has the necessary level of permissions to access network resource 170. Authorizing network identity 240 may include checking the authentication credentials of network identity 240 against one or more access policy to determine if network identity 240 may access network resource 170. For example, authorization may be granted through authorization strategies such as role-based access control (RBAC), attribute-based access control (ABAC), Relationship Based Access Control (ReBAC), graph-based access control (GBAC), and discretionary access control (DAC). Further, in some embodiments behavioral analysis or machine learning techniques may be used to perform the authorization. Authorization may verify access to the requested network resource 170 and determine whether network identity 240 can access network resource 170 and perform requested actions.

At step 325 of process 300, network resource proxy 120 may retrieve strong account credentials from secret hub 160. Secret hub 160 may contain API keys, passwords, certificates, strong account credentials, and other sensitive data in a secure storage system. Strong account credentials may be any type of privileged credentials that may be used to generate least-privilege ephemeral credentials. For example, strong account credentials stored in secret hub 160 may have more privileges than ordinary credentials and may be used to perform administrative tasks, create and modify user accounts, install software, update security, enable interactive logins, generate least-privilege ephemeral credentials, or any other tasks that ordinary credentials may not be permitted to perform. In this manner, strong account credentials may have a meaning known in the art and objectively determined, through reference to the use of other credentials in the system that are weaker or less permissive. Such a two-tier (or multi-tier) model of credentials may be used to distinguish strong account credentials from other credentials. Network resource proxy 120 may retrieve strong account credentials from secret hub 160 through a privileged access manager. For example, network resource proxy 120 may send a request to secret hub 160 to retrieve strong account credentials. In response, secret hub 160 may retrieve the strong account credentials, decrypt the protected strong account credentials, and return the strong account credentials to network resource proxy 120 over a secured channel.

At step 330 of process 300, network resource proxy 120 may create least-privilege ephemeral credentials. Ephemeral credentials may be dynamically created credentials that are generated at the moment access to network resource 170 is needed. Ephemeral credentials may provide a token or certificate necessary for network identity 240 to access or perform a requested action on network resource 170. Ephemeral credentials may expire after a specified period of time and may not be refreshed after expiration in some embodiments. Least-privilege ephemeral credentials may be generated based on one or more access policy in further embodiments. One or more access policy may contain the access level needed for network identity 240 to access or perform a requested action on network resource 170. A least-privilege ephemeral credential may be generated by comparing the requested action to the access level contained in the one or more access policy. In some embodiments, generating a least-privilege ephemeral account may be performed using a strong account.

At step 335 of process 300, network resource proxy 120 may open a just-in-time session to access network resource 170 using ephemeral credentials. A just-in-time session is a connection between network resource proxy 120 and network resource 170 that is created for a limited time to allow network identity 240 to access or perform a specific task on network resource 170. For example, a just-in-time session may be provisioned to elevate network identity 240 to access privileged network resource 170 on an as-needed basis for a limited time. The ephemeral credentials may be used to provision a one-time-use and just-in-time session between network proxy 120 and network resource 170. For example, network resource proxy 120 may create a reverse tunnel from network resource 170 to the customer environment which may connect network identity 240 to network resource 170 using the ephemeral credentials.

At step 340, network identity 240 may perform an action on network resource proxy 120 and at step 345, network resource proxy 120 may communicate that action to network resource 170. Network identity 240 may perform actions using native client and communication protocols without an agent. For example, network identity 240 may use a native client such as MS SQL Server Native Client, CLI, VSCode, or any other native client to perform actions on network resource proxy 120. Network identity 240 may perform actions such as accessing network resource 170, storing information on network resource 170, deleting or modifying information on network resource 170, or any other forms of operations requiring access to network resource 170. Network resource 170 may then verify the requested action from network identity 240 against one or more access policy to confirm network identity 240 has the necessary permissions to perform the requested action. If network resource 170 determines network identity 240 has the necessary permissions, network resource 170 may perform the requested action.

At step 350 network resource 170 may communicate an action result to network resource proxy 120 and at step 355 network resource proxy 120 may communicate the action result to network identity 240. After an action has been performed on network resource 170, network resource 170 may send information or data about the action result to network resource proxy 120. Network resource proxy 120 may then communicate the received information or data about the action result to network identity 240. Network identity 240 may then receive the information or data about the action result through the native client being used by network identity 240.

At step 360, network identity 240 may close the just-in-time session and at step 365, network resource proxy 120 may communicate that the just-in-time session has been closed to network resource 170. Network identity 240 may close the just-in-time session by terminating the session with network resource proxy 120. The just-in-time session may also be closed as a result of a violation of an access policy. For example, the just-in-time session may be terminated because an idle time of network identity 240 may exceed a specified duration of the access policy, network identity 240 may request to perform an action type that is not permitted under the access policy, network identity 240 may request to access a table or schema of network resource 170 that is not accessible under the access policy, network identity 240 may voluntarily end the connection after completing the requested actions, network identity 240 may be determined to be associated with anomalous or suspicious network behavior, or for any other reason that a connection may be terminated between network identity 240 and network resource 170.

At step 370 of process 300, network resource proxy 120 may decommission ephemeral credentials that provided access to network resource 170. Decommissioning the ephemeral credentials may comprise deleting the ephemeral credentials. For example, if network identity 240 attempted to connect to network resource 170 using the ephemeral credentials after terminating the just-in-time session, access would be denied because the ephemeral credentials would no longer exist. In further embodiments, network credentials may be invalidated, a network certificate or token may be erased, or any other form of access to network resource 170 through the ephemeral credentials may be deleted, revoked, or disabled. After the ephemeral credentials are decommissioned, network identity 240 would have to repeat process 300 to access network resource 170 or to perform additional actions on network resource 170.

Figure 4:
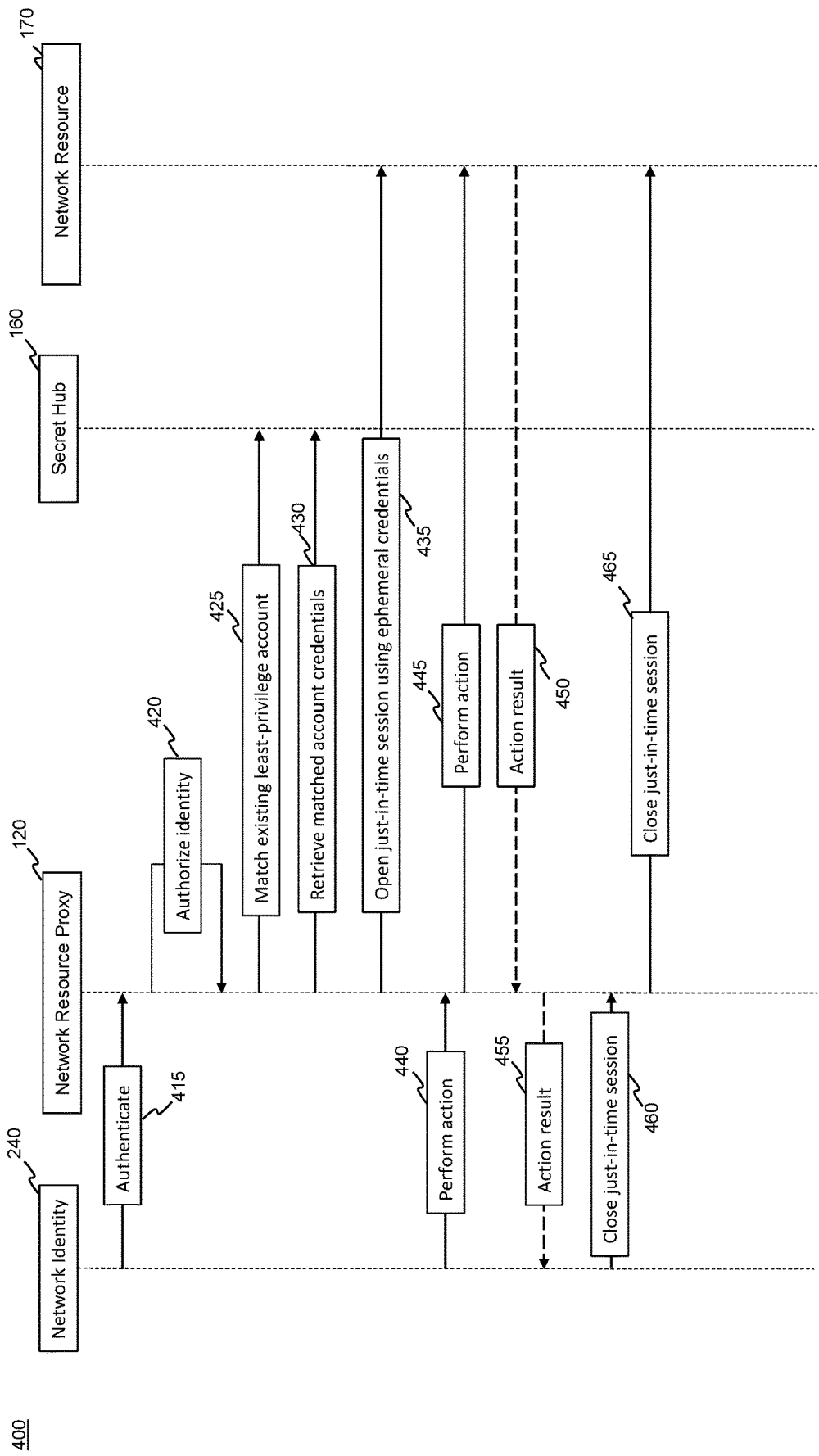
FIG. 4 is a block diagram showing an exemplary process for providing dynamic and least privilege access to a network resource using matched existing credentials in accordance with disclosed embodiments.

FIG. 4 is a block diagram depicting an exemplary process 400 for providing dynamic and least-privilege access to a network resource, consistent with the disclosed embodiments. At step 415, network resource proxy 120 may authenticate network identity 240. At step 420, network resource proxy 120 may authorize network identity 240. At step 435, network resource proxy 120 may open a just-in-time session with network resource 170 using ephemeral credentials. At steps 440 and 445, network identity 240 may perform an action on network resource proxy 120 and network resource proxy 120 may communicate the performed action to network resource 170. At steps 450 and 455, network resource 170 may communicate an action result to network resource proxy 120 and network resource proxy 170 may communicate the action result to network identity 240. At steps 460 and 465, network identity may close the just-in-time session with network resource proxy 120 and network resource proxy 120 may close the just-in-time session with network resource 170. Steps 415, 420, and 435-465 may correspond with steps 315, 320, and 335-365 of process 300, as described herein.

At step 425, network resource proxy 120 may match an existing least-privilege account from secret hub 160. An existing least-privilege account may be an account stored in secret hub 160 that is not decommissioned or deprovisioned after use by a network identity. For example, an existing least-privilege account may be an account stored in secret hub 160 that has permissions to access and perform one or more specific actions on network resource 170. Matching an existing least-privilege account from secret hub 160 may be based on one or more access policies. In some embodiments, network resource proxy 120 may match an existing least-privileged account based on a predefined permitted existing account list that network identity 240 may be authorized to use based on one or more access policy. For example, network resource proxy 120 may identify an existing least-privileged account in secret hub 160 based on a list of permitted existing accounts and determine that network identity 240 is authorized to use the identified existing least-privilege account to access network resource 170. Network resource proxy 120 may then match network identity 240 to the existing account from secret hub 160. In other embodiments, network resource proxy 120 may match network identity 240 to an existing account in secret hub 160 based on a list of permissions network identity 240 needs to access network resource 170 based on one or more access policy. For example, an existing account may be chosen that has the minimum least-privilege necessary to access and perform requested actions on network resource 170 based on a comparison of the list of permission levels that network identity 240 needs and the one or more access policy.

At step 430, network resource proxy 120 may retrieve matched account credentials from secret hub 160. Network resource proxy 120 may send a request to secret hub 160 to retrieve matched account credentials. Secret hub 160 may retrieve and decrypt the matched account credential and return the credential to network resource proxy 120 over a secured channel. A secured channel may be HTTPS with TLS, or any other secure channel connection.

Figure 5:
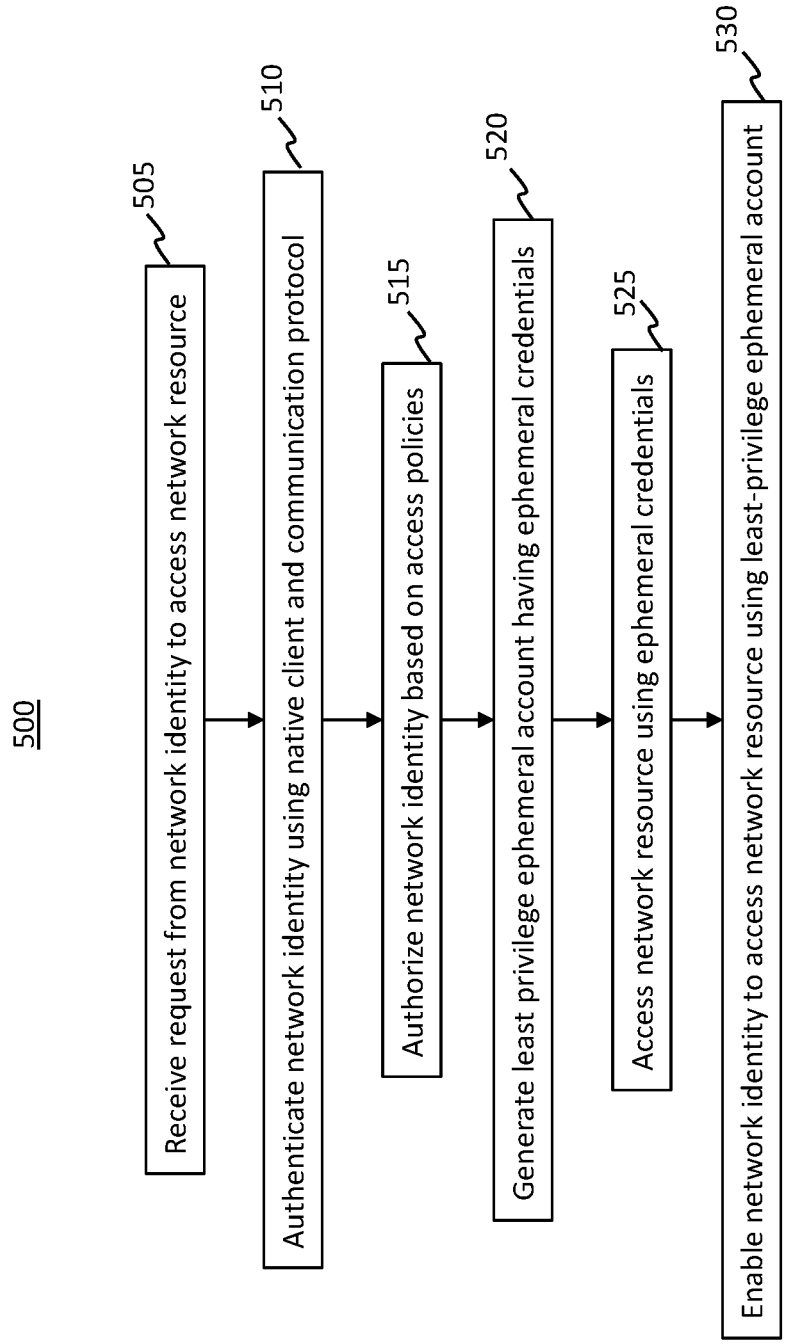
FIG. 5 is a flowchart showing an exemplary process for providing dynamic and least-privilege access to a network resource in accordance with disclosed embodiments.

FIG. 5 is a block diagram depicting an exemplary process 500 for providing dynamic and least-privilege access to a network resource. Step 505 of process 500 may include receiving a request from network identity 240 to access network resource 170. The requested access may include a request to perform any operation requiring privileged access to network resource 170. For example, the requested access may include a read request in which network identity 240 requests access to data associated with network resource 170 such as data stored in a memory, database of network resource 170, or any other stored data. In other embodiments, the requested access may comprise a request to perform one or more actions on the network resource 170. For example, the requested action may include a write request in which network identity 320 is requesting permission to modify, delete, or write data on network resource 170. Various other forms of requests may also be received in step 505.

At step 510, the network identity may be authenticated using a native client and communication protocol. For example, step 510 may correspond to step 315 for authenticating network identity 240, as described above with respect to FIG. 3. In some embodiments, authentication of network identity 240 may be performed using a personal account and a credential of network identity 240. A personal account of network identity 240 may be an account used by network identity 240 to access network resource 170. For example, a personal account of network identity 240 may comprise basic identifying information about network identity 240 and may include name, company name, account numbers, contact information, or any other information that may be used to identify network identity 240. The personal account of network identity 240 may be accessed using a credential of network identity 240. Credentials may include a username, password, access code, digital certificate, token, or any other form of information that can be used to authenticate network identity 240.

Authentication of network identity 240 may be done using a native client and communication protocol. A native client may include an application that is developed for use on the operating system it is running on. For example, a native client may include an MSSQL Client, CLI, VSCode, or any other application developed for use on the operating system being used by network identity 240. The native client may be configured to communicate transparently with network resource 170. For example, the native client may communicate in a manner that is transparent, or invisible, to network identity 240. Transparent communication between the native client and network resource 170 may be communication that does not create interruptions in network identity's 240 execution of the request for access to network resource 170. For example, transparent communication between the native client and network resource 170 may comprise exchanging information between the native client and network resource 170 in a manner that is not observable to network identity 240. Transparent communication between the native client and network resource may allow network identity 240 to access network resource 170 in the same manner in which network identity 240 would access a local resource. Native communication protocols may include rules and conventions for exchanging information between devices through a network or other media. For example, native communication protocols may be hypertext transfer protocol (HTTP), transmission control protocol (TCP), user datagram protocol (UDP), internet relay chat (IRC), or any other protocol suitable for transmitting information between systems.

Authenticating network identity 240 using an existing protocol may occur conditional on network identity 240 using a native client. Authentication of network identity 240 may occur through an agentless environment. For example, authentication of identity 240 may occur without any additional service, daemon, or process running in the background of computing device 130. In some embodiments, authentication of network identity 240 may not occur if network identity 240 uses a non-native client.

In some embodiments, using the native client and communication protocol may comprise identifying parameters to connect to a proxy and an identification of the network resource. A proxy may comprise a system, application, or other resource that provides an intermediary connection between network identity 240 and network resource 170. For example, a proxy may be configured to monitor and process requests and other communications between network identity 240 and network resource 170. A proxy may be a hardware proxy or a software proxy. For example, a hardware proxy may be between network identity 240 and network resource 170 to receive (e.g., intercept or directly receive), assess (e.g., parse communications headers, payload, etc.), send, and forward requests. A software proxy may be accommodated through a network resource provider or exist in the cloud. A proxy may be a forward proxy, a reverse proxy, a web proxy server, an anonymous proxy, a high anonymity proxy, a transparent proxy, a distorting proxy, or any other form of proxy that provides communication between network identity 240 and network resource 170.

Parameters to connect to a proxy may mediate connections between network identity 240 and network resource 170. For example, parameters to connect to a proxy may include a proxy server address, a username, password, or other credentials required to access the proxy, a port used to interact with the proxy, or any other configuration required to connect to a proxy. In some embodiments, parameters to connect to a proxy may indicate information such as the identity making the request to access network resource 170, a software application sending or receiving the request to access network resource 170, a type of network access request (such as to access, modify, delete, create, etc.), or various other types of parameters. An identification of a network resource may comprise parameters to connect to network resource 170. For example, identification of network resource 170 may include a source and destination address and port, protocol, domain name system information, IP address information, or any other connection information for identifying network resource 170.

At step 515, network identity 240 may be authorized based on one or more access policy. For example, step 515 may correspond to step 320 for authorizing network identity 240, as described with respect to FIG. 3. An access policy may comprise rules for accessibility of network resource 150. For example, an access policy may be any rule or requirement used to secure and restrict access to network resource 170. For example, an access policy may enforce when network identity 240 may access or perform actions on network resource 170. Access policy may create conditions that must be met by network identity 240 before network resource 170 may be accessed. For example, in some embodiments, an access policy may be based on a time restriction, a number of times network identity 240 may connect to network resource 170, or an idle time of network identity 240, etc. A time restriction may be a condition of an access policy that restricts access to network resource 170 based on the time the request to access network resource 170 is made. For example, the time restriction may restrict access to network resource 170 before a specified time or day, after a specified time of day, or within a range of specified times of day. The number of times network identity 240 may access network resource 170 may be a condition of an access policy that restricts how many times network identity 240 may access network resource 170. For example, the access policy may restrict access of network resource 170 to a specified number of times within a specified period of time. An idle time of network identity 240 may be a condition that governs how long network identity 240 may be inactive within network resource 170 before network identity 240 loses access to network resource 170. For example, the access policy may restrict an idle time to a specified duration of time. Activity within network identity 240 may refer to any user interaction with network resource 170 within the context of network resource 170. For example, activity may include a mouse click, a keyboard press, a command input, or any other interaction with network resource 170.

In some embodiments, an access policy may be based on one or more attributes related to a user machine, network identity 240, one or more network attributes, a requested action type, a requested resource type, or one or more environmental conditions. An attribute of a user machine may include specific attributes of computer device 130. For example, attributes of a user machine may include an operating system, a device ID, a serial number, a location, a host name, a directory ID, or any other identifier that defines attributes of a user machine. An access policy may allow or restrict access to network resource 170 based on attributes of the user machine used by network identity 240. An access policy based on one or more network attributes may include policies based on how the network of user device 130 may communicate with other networks. For example, a network attribute may include an IP address, a network interface name, a system name, or any other attribute of a network. An access policy may restrict or allow access to network resource 170 based on one or more attributes of the network used by network identity 240. An access policy may also allow or restrict access to network resource 170 based on the network identity 240 as discussed above. A requested action type may indicate the types of commands network identity 240 may request be performed on network resource 170. For example, a requested action type may include a request to add, delete, or modify data within network resource 170, a request to access network resource 170, a request to fetch data from network resource 170, or any other request to interact with network resource 170. An access policy may restrict or allow network identity 240 to interact with network resource 170 based on the type of action requested by network identity 240. A requested resource type may include the type of information network identity 240 has requested to access from network resource 170. A request resource type may include a type of database, a table, a scheme, a name, a variable, or any other resources within network resource 170. An access policy may allow or restrict access to network resource 170 based on the type of resource requested by network identity 240. An environmental condition may include any type of condition related to an environment of network identity 240. For example, environmental conditions may include weather, temperature, time of day, or any other conditions related to the environment of network identity 240. An access policy may allow or restrict access to network resource 170 based on the environmental conditions of network identity 240.

In some embodiments, an access policy may be based on an address of network resource 170, an instance name of network resource 170, a schema of network resource 170, a type of command, a table of network resource 170, a column of network resource 170, or a row of network resource 170. An address of network resource 170 may include a unique identifier to identify network resource 170 that may contain location information and make network resource 170 available for communication. For example, an address of network resource 170 may be a unique string of numbers, a name, or any other identifier of network resource 170. An access policy may restrict or allow access by network identity 240 to network resource 170 based on the address of network resource 170 that network identity 240 requests to access. An instance name may be a way to define a specific instance for a particular version of network resource 170. For example, an instance name may be used to connect to specific a network resource 170 and may be the target of a connection request from network identity 240. An access policy may restrict or allow network identity 240 to access network resource 170 based on the requested instance name. A schema of network resource 170 may define how data is organized within network resource 170. For example, a network resource schema may include table names, fields, data types, and relationships between these logical constraints. The schema of network resource 170 may organize data into separate entities and allow a single schema to be shared or accessed within another network resource. An access policy may control access to network resource 170 through permissions associated with each specific schema. Access policies based on types of commands may include the types of instructions network identity 240 may communicate to network resource 170 to perform specific task, functions, or queries. For example, a type of command may be a command to change the structure of network resource 170, a command to insert, update, or delete information within network resource 170, a command to fetch information from network resource 170, or any other interaction with network resource 170. An access policy may restrict or allow network identity 240 to perform commands on network resource 170 based on the type of command requested. A table of network resource 170 may be a collection of related data held in a table format within network resource 170. For example, a table of network resource may include a set of data elements using a model of vertical columns and horizontal rows. An access policy may restrict or allow access to network resource 170 based on the table, column, or row requested by network identity 240.

At step 520 of process 500, a least-privilege ephemeral account having ephemeral credentials may be generated based on the one or more access policy. A least-privilege ephemeral account may refer to an account with restricted access rights. For example, a least-privilege ephemeral account generated for network identity 240 may be limited or restricted to allow network identity 240 to access only the elements of a network resource 170 that are needed to complete a specific task or request. The least-privilege ephemeral account may allow network identity 240 to access network resource 170 or run privileged commands on network resource 170 on a temporary and as-needed basis. The least-privilege ephemeral account may comprise provisioning privileged just-in-time access to network resource 170. For example, a least-privilege ephemeral account may elevate network identity 240 in real-time to provide a specific elevated privileged access to network resource 170 to perform a necessary task.

A least-privilege ephemeral account may have ephemeral credentials. Ephemeral credentials may be dynamically created credentials that are generated at the moment access to network resource 170 is needed. Ephemeral credentials may provide a token or certificate necessary for network identity 240 to access or perform a requested action on network resource 170. Ephemeral credentials may expire after a specified period of time and may not be refreshed after expiration.

Least-privilege ephemeral accounts may be generated based on one or more access policy. One or more access policy may contain the access level needed for network identity 240 to access or perform a requested action on network resource 170. A least-privilege ephemeral account may be generated by comparing the requested action to the access level contained in the one or more access policy. Generating a least-privilege ephemeral account may give network identity 240 the minimum necessary access level to perform a requested action on network resource 17.

In some embodiments, generating a least-privilege ephemeral account may be performed using a privileged account. A privileged account may be any account that has more privileges than an ordinary user. For example, a privileged account may be able to install or remove software, upgrade an operating system, modify a system or application configurations, perform security functions, or perform any actions on network resource 170 that an ordinary user is not permitted to do. A privileged account may also have administrative privileges to generate least-privilege ephemeral accounts.

In step 525 of process 500, network resource 170 may be accessed using ephemeral credentials. Network resource 170 may be accessed, for example, through a reverse tunnel from network resource 170 to network identity 240. Network identity 240 may then be connected to network resource 170 through the ephemeral credentials using a secure connection, such as a connection using a tabular data stream (TDS) protocol, or a similar connection protocol. While TDS is used by way of example, it is to be understood that various other forms of secure connections may be used, and the present disclosure is not limited to any particular connection protocol or configuration. An ephemeral role may be created on the tunnel which may be used as part of the connection between network resource 170 and network identity 240.

At step 530 of process 500, network identity 240 may be enabled to access network resource 170 using the least-privilege ephemeral account using the native client and communication protocol. Network identity 240 may use the ephemeral role created as part of the connection between network identity 240 and network resource 170 to access network resource 170. For example, network identity 240 may perform requested actions on network resource 170 using native client and communication protocols. The least-privilege ephemeral account may be used to exchange information between the network resource 170 using a native client as disclosed herein and network resource 170 in a manner that is not observable to network identity 240. Network identity 240 may use the least-privilege ephemeral account to communicate with network resource 170 to perform actions in the same manner in which network identity 240 would access a local resource.

In some embodiments, the least-privilege ephemeral account and the ephemeral credentials may be decommissioned after termination of a connection with network resource 170. The connection between network identity 240 and network resource 170 may be terminated in response to a command from (or based on) an access policy. For example, the connection may be terminated because an idle time of network identity 240 may exceed a specified duration of the access policy, network identity 240 may request to perform an action type that is not permitted under the access policy, network identity may request to access a table or schema of network resource 170 that is not accessible under the access policy, network identity 240 may voluntarily end the connection after completing the requested actions, a behavioral profile or pattern may be violated, or for any other reason that a connection may be terminated between network identity 240 and network resource 170.

Decommissioning the least-privilege ephemeral account and ephemeral credentials may comprise, for example, deleting the ephemeral account and ephemeral credentials. Decommissioning the least-privilege ephemeral account and ephemeral credentials in step 515 may correspond to step 370 for decommissioning ephemeral credentials, as described with respect to FIG. 3. For example, if network identity 240 attempted to connect to network resource 170 using the least-privilege ephemeral account and ephemeral credentials, access would be denied because the least-privilege ephemeral account and ephemeral credentials no longer exist. In some embodiments, decommissioning the least-privilege ephemeral account and ephemeral credentials may be accomplished by invalidating the ephemeral credentials, erasing a network certificate or token, or deprovisioning any other form of access to network resource 170 through the least-privilege ephemeral account and ephemeral credentials. After the least-privilege ephemeral account and ephemeral credentials are decommissioned, network identity 240 would have to repeat process 500 to access network resource 170 or to perform additional actions on network resource 170.

In some embodiments, the steps of process 500 may further comprise a resource discovery stage. A resource discovery stage may use a resource discovery protocol to locate and retrieve existing resources based on particular attributes across multiple domains. Resource discovery may discover resources that are in active or usable states or resources that have been terminated or otherwise made inactive. For example, resource discovery may be used to discover network resource 170 and other resources that may be accessed by network identity 240. After discovering resources through resource discovery, the attributes of the discovered resources may be determined. Attributes of discovered resources that may be determined may include server information, network information, block storage devices, network appliances, resource pools, operating systems, and any other attributes related to discovered resources.

In some embodiments, one or more access policies may be generated based on the discovery of the network resource integration. Attributes of the discovered resources may be used to determine the types of ephemeral accounts and ephemeral credentials that may be needed to allow network identity 240 to access the discovered network resources. Information, such as the operating system the network resource runs on, the server information of the network resource, or any other information relating to the network resource, may be needed to generate an ephemeral account and ephemeral credentials that are capable of accessing the specific network resource. Through the resource discovery stage, this information relating to network resources may be discovered and generated into an access policy that can be used to generate ephemeral accounts and ephemeral credentials to access the discovered network resources.

Figure 6:
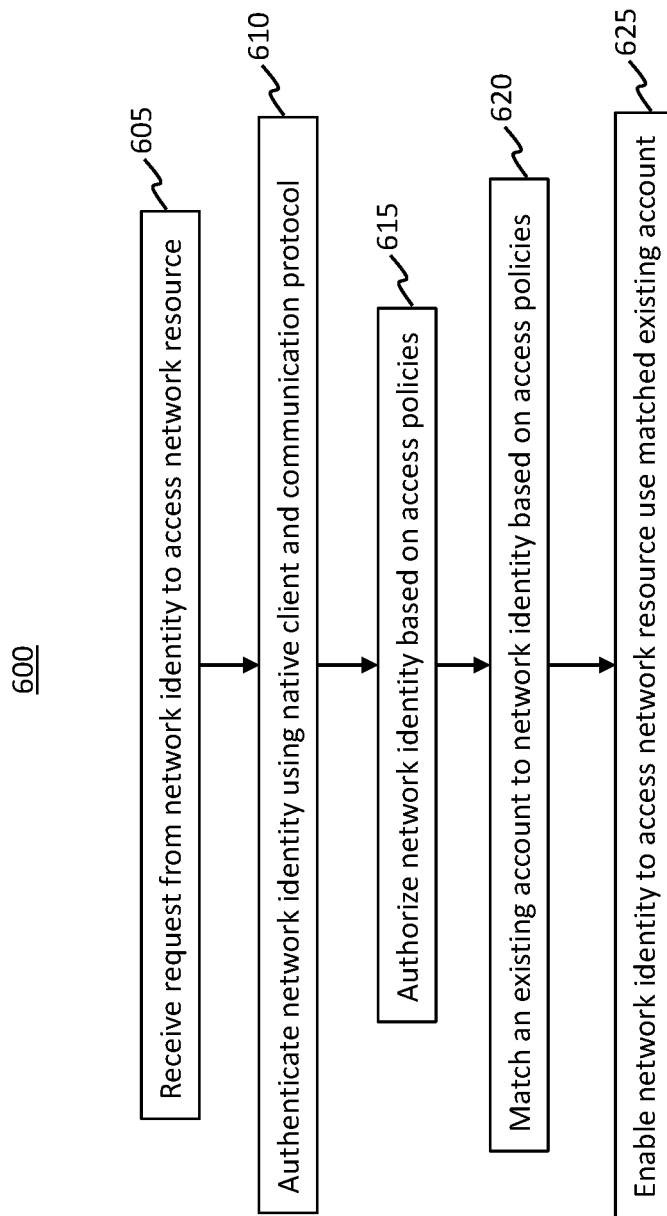
FIG. 6 is a flowchart showing an exemplary process for providing dynamic and least privilege access to a network resource using matched existing credentials in accordance with disclosed embodiments.

FIG. 6 is a block diagram depicting an exemplary process 600 for providing dynamic and least-privilege access to a network resource. At step 605, process 600 may include receiving a request from network identity 240 to access network resource 170. At step 610, process 600 may include authenticating network identity 240 using a native client and communication protocol, wherein the native client is configured for communicating transparently with network resource 170. At step 615, process 600 may include authorizing network identity 240 based on one or more access policy, the one or more access policy comprising rules for network resource accessibility. At step 625, process 600 may include enabling network identity 240 to access network resource 170 using the matched existing account, using the native client and communication protocol. Steps 605, 610, 615, and 625 of process 600 may correspond with steps 505, 510, 515, and 525 of process 500 as described herein.

At step 620, process 600 may include matching an existing account to network identity 240 based on one or more access policy. For example, step 620 may correspond to step 425 for matching an existing account to network identity 240, as described above with respect to FIG. 4. In other embodiments, matching an existing account to network identity 240 may comprise accessing a list of permitted existing accounts, accessing a list of permissions that network identity 240 needs to perform the requested actions, and choosing a least-privilege account from the list of permitted existing accounts based on the access policies. A list of permitted existing accounts may be accessed from secret hub 160. For example, secret hub 160 may contain a list of predefined permitted existing accounts that each network identity can use. Secret hub 160 may also contain a list of permissions that may be needed to perform various requested actions. For example, a list may contain various permissions levels preconfigured by network security administrators. The list may further contain the permission levels that are needed to perform specific requested tasks. A least-privileged account may be chosen from the list of permitted existing account that will allow network identity 240 to perform the requested actions on network resource 170 based on the access policies. The existing least-privileged account may then be matched to network identity 240 based on the match between the list of permitted existing accounts and the list of permission levels required to perform specified actions on network resource 170.

In some embodiments, process 600 may further include accessing a credential. A credential may be a short-lived credential, a long-lived credential, or any other type of credential that may be used to access network resource 170. For example, the credential may be a password, a token, an encryption key, a certificate, or any other form of verification that may be used to authorize access to network resource 170. In some embodiments, the credential may be an ephemeral credential as described herein. Ephemeral credentials may provide a token or certificate necessary for network identity 240 to access or perform a requested action on network resource 170 and may expire after a specified period of time without the ability to be refreshed. The credential may be accessed from secret hub 160 and used by network identity 240 to access network resource 170. In some embodiments, a credential for the existing least-privilege account may be fetched from a secure location. Fetching the credential may include accessing the credential from a secure location and sending the credential to be used by network identity 240. For example, a secure location may include secret hub 160, a credential manager, a credential vault, or any other location that may securely store credentials.

In some embodiments, a credential for the existing least-privilege account may be generated based on a strong account. A strong account may be an account with higher administrative privileges than an average account. For example, a strong account may be used to reset other account credentials, generate credentials for existing least-privilege accounts, or perform other functions that an average account is not permitted to perform. In some embodiments, a strong account may generate a credential for an existing least-privilege account.

In some embodiments, process 600 may include configuring access to an existing account to create credentials to an existing least-privilege account. Access to an existing account may be configured from secret hub 160. An existing account may be an account that is not decommissioned after use and can be used multiple times to access network resource 170. In some embodiments, an existing account may be a strong account as disclosed herein that may have privileges to create credentials to an existing least-privilege account. The created credentials may be a password, encryption key, token, certificate, or any other form of access credential for use in accessing network resource 170 by network identity 240 through an existing least-privilege account. An existing least-privileged account may be an account as disclosed herein that has the minimum level of privileges necessary for network identity 240 to perform requested actions on network resource 170.

In some embodiments, the request from network identity 240 may identify an account to connect with. As part of the request by network identity 240 to connect with network resource 170, network identity 240 may be required to identify the account with which to connect. The account which network identity 240 may identify to connect with may be an existing account on the permitted existing account list stored in secret hub 160. The account identified by network identity 240 may be compared with the list of permitted existing accounts in secret hub 160 to determine if the account is permitted to access and perform requested actions on network resource 170. If the account requested by network identity 240 is on the list of permitted existing accounts in secret hub 160, then network identity 240 may be able to use that account to access and perform requested actions on network resource 170. If the account is not on the list of permitted existing accounts in secret hub 160, then network identity 240 may not be permitted to use that account to access network resource 170.

Figure 7:
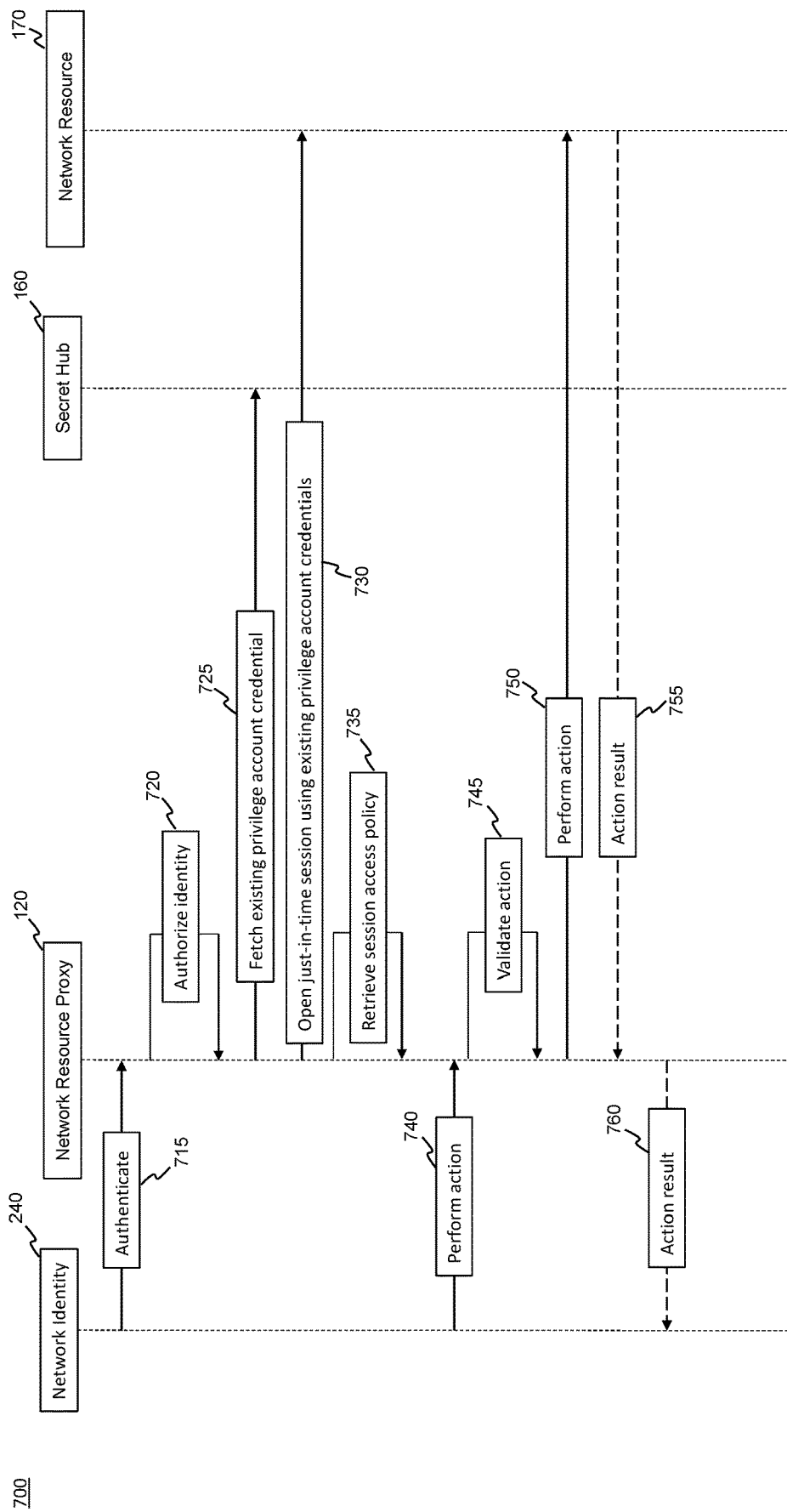
FIG. 7 is a block diagram showing an exemplary process for providing dynamic and monitored access to a network resource in accordance with disclosed embodiments.

FIG. 7 is a block diagram illustrating an exemplary process 700 for providing dynamic and monitored access to a network resource, consistent with disclosed embodiments. Process 700 may provide dynamic and monitored access to network resource 170 by network identity 240. At step 715, network resource proxy 120 may authenticate network identity 240. At step 720, network resource proxy 120 may authorize network identity 240. At steps 740 and 750, network identity 240 may perform an action on network resource proxy 120 and network resource proxy 120 may communicate the performed action to network resource 170. At steps 755 and 760, network resource 170 may communicate an action result to network resource proxy 120 and network resource proxy 170 may communicate the action result to network identity 240. Steps 715, 720, 740, and 750-760 may correspond with steps 315, 320, 340, and 345-355 of process 300, as described herein.

At step 725, network resource proxy 120 may fetch existing privilege account credentials from secret hub 160. Secret hub 160 may contain API keys, passwords, certificates, strong account credentials, and other sensitive data in a secure storage system, as disclosed herein. An existing privileged account credential may be a password, a token, an encryption key, a certificate, or any other form of verification that may be used to authorize access to network resource 170. For example, the privileged account credential may provide access to an account that has more privileges than a least-privilege account. An existing privilege account may be an account that is not decommissioned after use by network identity 240 and has privileges to perform certain actions on network resource 170 that other least-privilege accounts may not be permitted to perform. Network resource proxy 120 may fetch existing privilege account credentials from secret hub 160 through a privileged access manager. For example, network resource proxy 120 may send a request to secret hub 160 to fetch existing privilege account credentials. In response, secret hub 160 may retrieve the existing privilege account credentials, decrypt the protected existing privilege account credentials, and return the existing privilege account credentials to network resource proxy 120 over a secure channel.

At step 730, network resource proxy 120 may open a just-in-time session to access network resource 170 using existing privileged account credentials. A just-in-time session is a connection between network resource proxy 120 and network resource 170 that is created for a limited time to allow network identity 240 to access or perform a specific task on network resource 170, as disclosed herein. The existing privilege account credentials may be used to provision a one-time-use and just-in-time session between network proxy 120 and network resource 170. For example, network resource proxy 120 may create a reverse tunnel from network resource 170 to the customer environment which may connect network identity 240 to network resource 170 using the existing privilege account credentials.

At step 735, network resource proxy 120 may retrieve an access policy of the just-in-time session. In some embodiments, the access policy from the just-in-time session may be the same access policy as the one or more access policy used to authorize network identity 240, as disclosed herein. In other embodiments, the access policy from the just-in-time session may be a different access policy than the one or more access policy used to authorize network identity 240. The access policy of the just-in-time session may provide rules and requirements for actions that network identity 240 is permitted to perform on network resource 170. For example, the access policy may include rules that govern whether network identity 240 may modify, delete, or write data on network resource 170. Various other forms of requests may also be covered by access policies of the just-in-time session. Network resource proxy 120 may retrieve the access policy of the just-in-time session from a cached memory. Cached memory may be a volatile computer memory that may provide high-speed access to a processor storing the access policy. For example, cache memory may provide faster and easier access to the access policy than if the access policy was stored in a main memory or on a hard drive.

At step 745, network resource proxy 120 may validate an action requested by network identity 240. Validating an action may take place before the requested action is performed on network resource 170. Validating an action may comprise comparing the requested action to the access policy of the just-in-time session. For example, if the access policy allows network identity 240 to perform a requested action on network resource 170, then network resource proxy 120 may validate the action requested by network identity 240. If network resource proxy validates the requested action, it may then perform the requested action on network resource 170 as shown in step 750.

Figure 8:
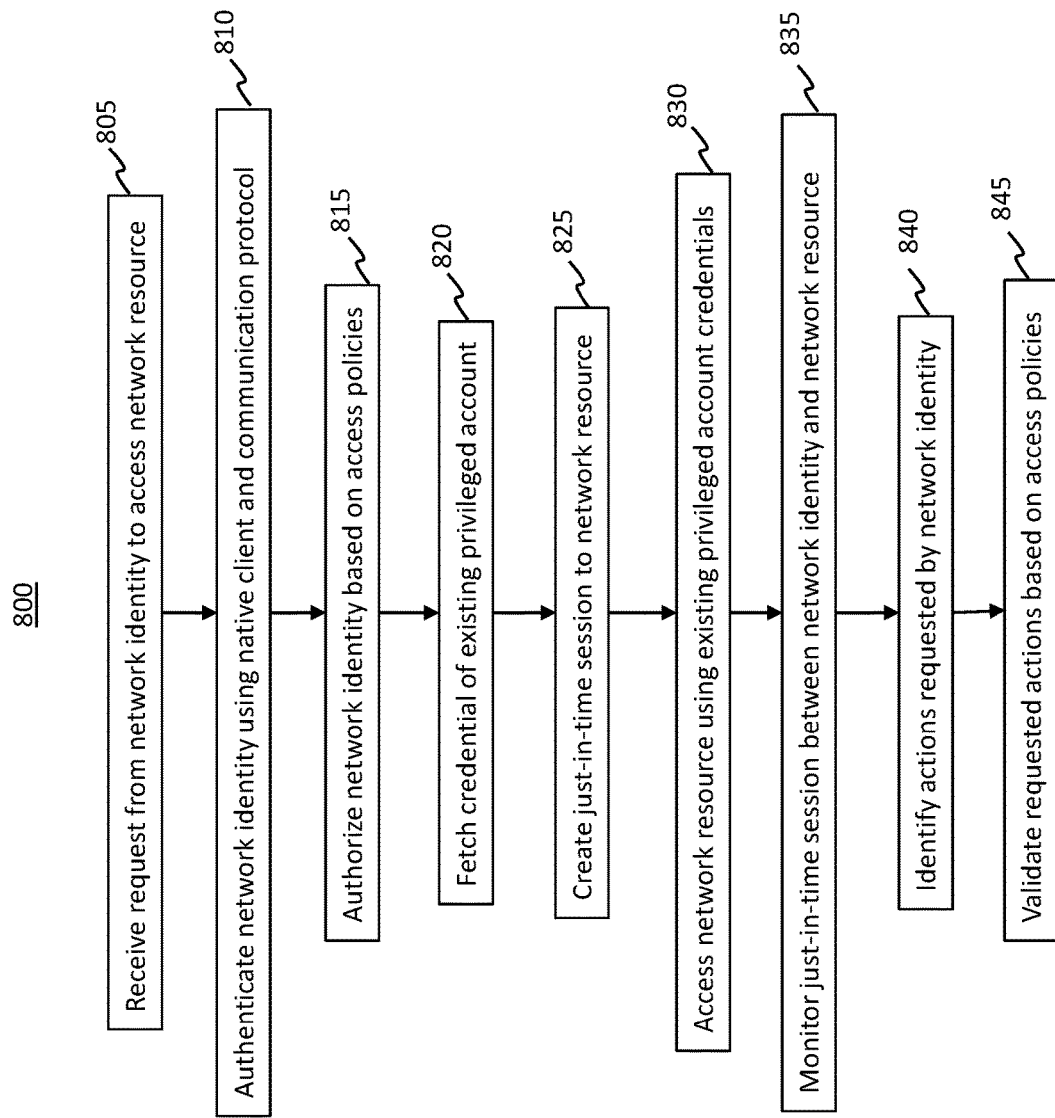
FIG. 8 is a flowchart showing an exemplary process for providing dynamic and monitored access to a network resource in accordance with disclosed embodiments.

FIG. 8 is a block diagram depicting an exemplary process 800 for providing dynamic and monitored access to a network resource. At step 805, process 800 may include receiving a request from network identity 240 to access network resource 170. At step 810, process 800 may include authenticating network identity 240 using a native client and communication protocol, wherein the native client is configured for communicating transparently with network resource 170. At step 815, process 800 may include authorizing network identity 240 based on one or more access policy, the one or more access policy comprising rules for network resource accessibility. At step 830, process 800 may include accessing network resource 170 using the credential of the existing privileged account. Steps 805, 810, 815, and 830 of process 800 may correspond with steps 505, 510, 515, and 525 of process 500 as described herein.

At step 820, process 800 may include fetching a credential of an existing privileged account. For example, step 820 may correspond to step 725 for fetching existing privileged account credentials, as described above with respect to FIG. 7. A credential of an existing privileged account may include any credential that may allow network identity 240 to access an existing privileged account 170, as disclosed herein. An existing privileged account may be an account stored in secret hub 160 that is not decommissioned or deprovisioned after use by network identity 240. For example, an existing privileged account may be an account stored in secret hub 160 that has permissions to access and perform one or more specific actions on network resource 170. In some embodiments, fetching a credential of an existing privileged account may comprise fetching the credential of an existing privileged account from a secure location. Fetching the credential may include accessing the credential from a secure location and sending the credential to be used by network identity 240. For example, a secure location may include secret hub 160, a credential manager, a credential vault, or any other location that may securely store credentials.

At step 825, process 800 may include creating a just-in-time session to network resource 170. For example, step 825 may correspond to step 730 for creating a just-in-time session to network resource 170, as described above with respect to FIG. 7. A just-in-time session to network resource 170 may be created by elevating a privilege level of network identity 240 to permit network identity 240 to access and perform specific actions on network resource 170. For example, by creating a just-in-time session, network resource proxy 120 may create a reverse tunnel from network resource 170 to the customer environment which may connect network identity 240 to network resource 170 and allow network identity 240 to perform one or more action on network resource 170.

At step 835, process 800 may include monitoring the just-in-time session between network identity 240 and network resource 170. Monitoring the just-in-time session may comprise recording the just-in-time session of network identity 240 with network resource 170 and providing real-time connection supervision. Monitoring the just-in-time session may include registering user actions such as mouse pointer movement, keystrokes, file transfers, actions modifying network resource 170, or any other action performed by network identity 240 in the just-in-time session. Monitoring the just-in-time session may allow system administrators or security officers to know in real-time if an access policy of a just-in-time session is being violated. In some embodiments, monitoring a just-in-time session may allow a system administrator or security officer to suspend or terminate active just-in-time sessions based on recorded actions performed by network identity 240 on network resource 170. Monitoring the just-in-time session may also include recording the network traffic with metadata, to allow a playback of the just-in-time session.

At step 840, process 800 may include identifying one or more action or command requested by network identity 240 within the native communication protocol. Network identity 240 may request to perform one or more action or command on network resource 170. For example, the requested action may include a write request in which network identity 320 is requesting permission to modify, delete, or write data on network resource 170, as disclosed herein. Network identity 240 may request one or more action or command within the native client communication protocol. Native communication protocols may include rules and conventions for exchanging information between devices through a network or other media, as disclosed herein. Native communication protocols may allow network identity 240 to request one or more action or command be performed on network resource 170 in the same manner in which network identity 240 would perform an action or command on a local resource. The one or more action or command may be identified. For example, the type of requested action or command may be identified, such as whether the requested action or command is to access network resource 170, modify, delete, or write data on network resource 170, or any other type of command involving network resource 170.

At step 845, process 800 may include validating the one or more requested action or command in real-time based on the one or more access policy. For example, step 845 may correspond to step 745 for validating an action, as described above with respect to FIG. 7. In some embodiments, validating the one or more requested action or command in real-time may comprise receiving a request from network identity 240 to perform an action through the just-in-time session, accessing the one or more access policy for the just-in-time session, and validating if the requested action is permitted based on the one or more access policy. Receiving a request from network identity 240 to perform an action through the just-in-time session may comprise receiving a request within a native communication protocol to read, write, modify, delete, or perform some other action on network resource 170 as disclosed herein. Accessing the one or more access policy for the just-in-time session may correspond to step 735, as described above with respect to FIG. 7. The access policy for the just-in-time session may be the same access policy used to authorize network identity 240 or may be a different access policy. For example, the access policy may include rules that govern whether network identity 240 may modify, delete, or write data on network resource 170. Various other forms of requests may also be covered by access policies of the just-in-time session. Network resource proxy 120 may retrieve the access policy of the just-in-time session from a cached memory, as disclosed herein. The requested action may be validated if the requested action is permitted based on the access policy.

The requested action may be compared to the access policy to determine if network identity 240 has the necessary permissions to perform the request action on network resource 170 under the access policy. If the access policy permits network identity 240 to perform the requested action on network resource 170, then the requested action may be validated. In some embodiments, validating the one or more requested action or command may occur before performing the one or more requested action or command on network resource 170. For example, network identity 240 may not be permitted to perform the requested action or command on network resource 170 until the requested action or command has been validated.

In some embodiments, the requested action may be performed on network resource 170 if the requested action is validated in step 845. Performing the action on network resource 170 may comprise communicating the requested action from network resource proxy 120 to network resource 170, as disclosed herein in steps 340 and 345 with respect to FIG. 3. In other embodiments, a message may be sent to network identity 240 through the just-in-time session in connection with the status of the requested action. For example, the message may be an error message, a message that the action could not be performed on network resource 170, a message that the requested action was performed on network resource 170, or any other message that reflects a status of the requested action. Network resource 170 may communicate the message to network resource proxy 120 and network resource proxy 120 may communicate the message to network identity 240.

In some embodiments, the operations may further comprise determining whether the requested action or command is permitted by the access policy and performing the requested action or command on network resource 170. Determining whether the requested action or command is permitted by the access policy may comprise comparing the requested action or command to the access policy. If the access policy contains rules that allows network identity 240 to perform the requested action or command on network resource 170, then it may be determined that network identity 240 may perform the requested action or command on network resource 170. The requested action or command may then be performed on network resource 170 by network resource proxy 120, as disclosed herein.

In some embodiments, it may be confirmed to network identity 240 that the requested action or command was performed on network resource 170. Performance of the requested action or command may be confirmed by sending a message to network identity 240 confirming that the requested action or command has been performed. In other embodiments, confirming to network identity 240 that the requested action or command was performed may comprise providing an action result to network identity 240.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments unless the embodiment is inoperative without those elements.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for providing dynamic and monitored access through a network resource proxy to a network resource, the operations comprising:
receiving a request from a network identity to access a network resource;
authenticating the network identity using a native client and communication protocol, wherein the native client is configured for communicating transparently with the network resource through the network resource proxy;

authorizing through the network resource proxy the network identity based on at least a first account of the network identity and according to one or more access policy retrieved from a storage location, the one or more access policy comprising rules for network resource accessibility;

fetching by the network resource proxy a credential of an existing privileged account;

creating through the network resource proxy a just-in-time session to the network resource to access the network resource using the retrieved existing privileged account;

monitoring, through the network resource proxy, the just-in-time session between the network identity and the network resource, according to the retrieved one or more access policy;

identifying, through the network resource proxy, one or more action or command requested by the network identity within the native communication protocol; and continuously validating the one or more requested action or command in real-time during the just-in-time session according to the one or more access policy after authorizing the received access request from the network identity.

2. The non-transitory computer readable medium of claim 1, wherein the operations further comprise configuring access to an existing account to create credentials to the existing account.

3. The non-transitory computer readable medium of claim 1, wherein fetching existing credentials comprises fetching the credentials for the existing privileged account from a secure location.

4. The non-transitory computer readable medium of claim 1, wherein validating the one or more actions performed by the network identity comprises:

receiving a request from the network identity to perform an action through the just-in-time session;

accessing the one or more access policy for the just-in-time session; and validating if the requested action is permitted based on the one or more access policy.

5. The non-transitory computer readable medium of claim 4, wherein the operations further comprise performing the requested action on the network resource if the requested action is validated.

6. The non-transitory computer readable medium of claim 4, wherein the operations further comprise sending a message to the network identity through the just-in-time session in connection with the status of the requested action.

7. The non-transitory computer readable medium of claim 1, wherein the operations further comprise:

determining whether the requested action or command is permitted by the access policy; and performing the requested action or command on the network resource.

8. The non-transitory computer readable medium of claim 1, wherein the operations further comprise confirming to the network identity that the requested action or command was performed.

9. The non-transitory computer readable medium of claim 1, wherein the network resource is a database.

10. The non-transitory computer readable medium of claim 1, wherein the request to access the network resource further comprises a request to perform one or more actions on the network resource.

11. The non-transitory computer readable medium of claim 1, wherein the operations further comprise a resource discovery stage.

12. The non-transitory computer readable medium of claim 11, wherein the operations further comprise generating one or more access policies based on the discovery of the network resource integration.

13. The non-transitory computer readable medium of claim 1, wherein authenticating the network identity is performed using a personal account and a credential of the network identity.

14. A computer-implemented method for providing dynamic and monitored access through a network resource proxy to a network resource, the method comprising:

receiving a request from a network identity to access a network resource;

authenticating the network identity using a native client and communication protocol, wherein the native client is configured for communicating transparently with the network resource through the network resource proxy;

authorizing through the network resource proxy the network identity based on at least a first account of the network identity and according to one or more access policy retrieved from a storage location, the one or more access policy comprising rules for network resource accessibility;

fetching by the network resource proxy a credential of an existing privileged account;

creating through the network resource proxy a just-in-time session to the network resource to access the network resource using the retrieved existing privileged account;

monitoring, through the network resource proxy, the just-in-time session between the network identity and the network resource, according to the retrieved one or more access policy;

identifying, through the network resource proxy, one or more action or command requested by the network identity within the native communication protocol; and continuously validating the one or more requested action or command in real-time during the just-in-time session according to the one or more access policy after authorizing the received access request from the network identity.

15. The computer implemented method of claim 14, wherein the fetched credential of the existing privileged account is an ephemeral credential created to access the just-in-time session with the existing privileged account.

16. The computer implemented method of claim 14, wherein validating the one or more requested action or command occurs before performing the one or more requested action or command.

17. The computer-implemented method of claim 14, wherein the request to access the network resource further comprises a request to perform one or more actions on the network resource.

18. The computer-implemented method of claim 14, wherein the one or more access policy is based on a time restriction, the time restriction comprising a policy governing when the network identity can connect to the network resource, a number of times the network identity can connect to the network resource, or an idle time of the network identity.

19. The computer-implemented method of claim 14, wherein the one or more access policy is based on attributes related to the network identity, a user machine, network related attributes, requested action types, requested resource types, or environmental conditions.

20. The computer-implemented method of claim 14, wherein the one or more access policy is based on an address of the network resource, an instance name of the network resource, a schema of the network resource, a table of the network resource, or a row of the network resource.

\* \* \* \* \*